United States Patent [19]

Esteban et al.

[11] 4,216,354
[45] Aug. 5, 1980

[54] PROCESS FOR COMPRESSING DATA RELATIVE TO VOICE SIGNALS AND DEVICE APPLYING SAID PROCESS

[75] Inventors: Daniel J. Esteban; Claude R. Galand, both of La Gaude; Daniel Mauduit, Nice; Jean Menez, Cagnes-sur-Mer, all of France

[73] Assignee: International Business Machines Corporation, Armonk, N.Y.

[21] Appl. No.: 964,324

[22] Filed: Nov. 29, 1978

[30] Foreign Application Priority Data

Dec. 23, 1977 [FR] France .................. 77 39912

[51] Int. Cl.² .................................................. G10L 1/00
[52] U.S. Cl. ........................... 179/15.55 R; 179/1.5 A
[58] Field of Search ................. 179/15.55 R, 15.55 T, 179/1.5 A

[56] References Cited

U.S. PATENT DOCUMENTS

| | | | |
|---|---|---|---|
| 2,949,505 | 8/1960 | Kretzmer | 179/15.55 R |
| 3,952,164 | 4/1976 | David et al. | 179/15.55 R |

Primary Examiner—Malcolm A. Morrison
Assistant Examiner—E. S. Kemeny
Attorney, Agent, or Firm—John B. Frisone

[57] ABSTRACT

A voice signal is transmitted digitally at reduced bit rate by use of data compression. The original frequency components of a telephone band width of the voice signal sampled at 8 KHz and quantized with 12 bits are transformed into three parameters: SIGNAL data representing adaptive quantization for lower frequency (300–800 Hz) sub-bands; COEF data representing pre-emphasized parcor type coefficients for the higher frequency (800–3000 Hz) band; and, ENERGY data representing higher frequency short term energy level. The three parameters are multiplexed for transmission in binary-code form, thereby representing a recoding of the original binary-coded voice signals.

16 Claims, 11 Drawing Figures

PROCESS FOR COMPRESSING DATA RELATIVE TO VOICE SIGNALS AND DEVICE APPLYING SAID PROCESS

DESCRIPTION

Technical Field

This invention relates to voice coding at low bit rate or, more particularly, to digital transcoding to provide a compressed voice signal.

The various steps required for processing a time-varying signal which has to be recorded, transmitted or modified as required by the application, can be performed either in analog or digital mode. Analog processing usually involves, the use of complex and expensive means. Digital processing is generally preferred even though it involves a preliminary digital conversion of the signal to be processed. For this purpose, the signal is sampled, then quantized, and expressed in binary-coded words. Of course, it is obvious that the signal will have to be decoded at the end of the processing steps to put the information back into analog form useful to humans. The coding and decoding steps affect the information, usually by introducing noise, e.g., quantizing noise. However, by quantizing as accurately as possible, one can reduce quantizing noise. When this operation is carried out, all the samples, the amplitude of which lie between two consecutive digital values, are translated into the same number. This results in an inaccurate transcription which becomes more important as the number of the digital values which can be used for coding the signal is reduced. Therefore, it is necessary to increase this number to improve the coding quality. This, however, is undesirable under certain conditions since it may overload channels provided for transmitting the data, in the memories provided for storing the data and in the circuits provided for their processing, all of which affects the cost of the hardware used.

Many solutions have been proposed for improving the coding quality while reducing the quantizing bit number, however, these solutions are not complete and often appear to be expensive. It is therefore desirable to achieve a solution which tends to reduce the coding bit rate while maintaining the same quality or conversely to improve the coding quality at a given bit rate.

OBJECTS OF THE INVENTION

An object of this invention is to provide a process for improving the coding quality at a given total bit rate.

Another object of this invention is to provide a device for implementing said process.

It should be noted that the main portion of the signal processing operation required within the scope of this invention is to be performed in digital mode. This involves a preliminary signal sampling and quantization operation performed by using conventional methods using a bit rate high enough to reduce noise, and then recode the data at a lower bit rate. In other words, the information is compressed by performing a transcoding operation.

In addition, since the unique properties of the human voice will be used, it can be said that another object of this invention is to provide a voice compression process.

Another object of this invention is to provide a digital transcoder implementing said process.

The foregoing and other objects, features and advantages of the invention will be apparent from the following more particular description of the preferred embodiments of the invention, as illustrated in the accompanying drawings.

SUMMARY OF INVENTION

Data compression is performed on a telephone bandwidth of a voice signal sampled and quantized with a relatively high number of bits, the frequency bandwidth of said voice signal is first split into high and low frequency bands. The high frequency band is processed to derive therefrom pre-emphasized parcor type of coefficients which are then requantized to generate COEF data. The low frequency band is split into p sub-bands and each sub-band is submitted to an adaptive sub-band block quantizing operation which generates SIGNAL data over the p sub-bands. High band energy information is also derived from said high frequency band, which energy information is quantized into ENERG data. The ENERG, SIGNAL and COEF data, together, provide data representing the compressed voice signal.

BRIEF DESCRIPTION OF DRAWINGS

FIG. 7' illustrates one of the elements of the decoder shown in FIG. 7.

BACKGROUND

N-bit binary coding allows $2^N$ different digital values to be defined. To perform this coding operation, the swing of the signal to be coded is split into $2^N$ values. Consequently, the smaller the signal swing, the more accurate the coding.

Taking the characteristics of the voice signal into consideration, Chong Kwan Un and D. Thomas Magill have proposed in the IEEE Transactions on Communications, Vol. COM 23, No. 12, December 1975, to reduce the dynamic range of the voice signal before carrying out the coding step, by performing a deconvolution operation before coding the base band of the voice signal through a delta modulator. The deconvolution step involves the use of a self-adaptive digital filter. This filtering operation involves a large digital processing workload. In addition, with such an arrangement, it is more convenient to quantize differently the coefficients depending upon whether they are intended for the deconvolution operations or for being transmitted to a receiver device; which still further increases the computing power required to realize the coder-decoder assembly.

DESCRIPTION OF THE PREFERRED EMBODIMENTS

Figure 1:
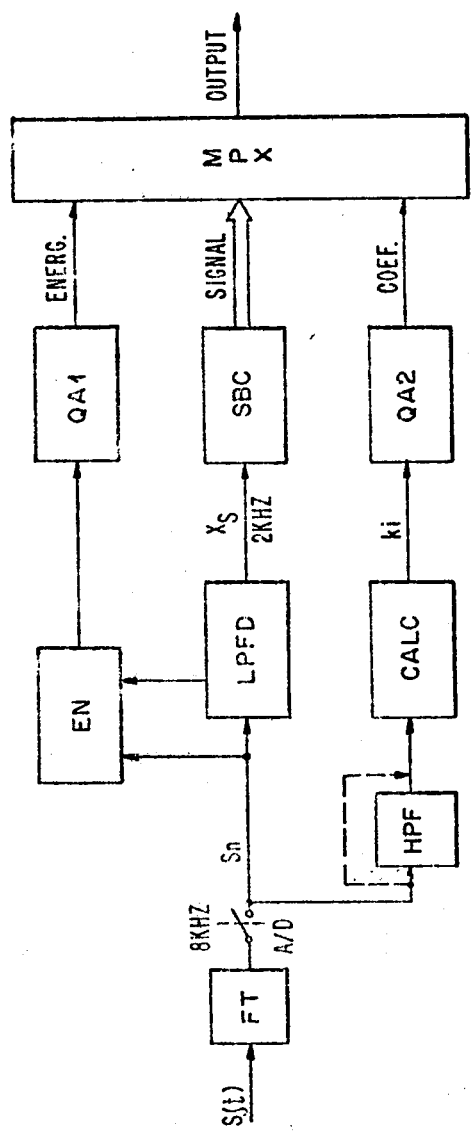
FIG. 1 is a block diagram of a coder constructed according to the invention.

This invention provides a solution to the above mentioned problems. For this purpose, as shown in FIG. 1, the voice signal S(t) is filtered through FT in order to occupy only a typical telephone bandwidth (300–3400 Hz), then sampled at a first given rate 8 KHz and quantized in A/D at a relatively high number of bits (12 bits per sample). A/D provides a signal, the $n^{th}$ sample of which is designated Sn. (In the following, we can use the same reference for the signal itself and for its samples.) This signal is then transmitted to both a lowpass filter decimator (i.e., periodic resampler LPFD and to a high pass filter HPF. The combined bandwidth of these two filters can be made complementary to cover the above-indicated telephone bandwidth. The HPF output feeds a coefficient determining device CALC, the purpose of which will be explained later on. The data provided by the CALC is requantized in a quantizer QA2 to generate a signal designated COEF. The signal delivered by filter LPFD, the bandwidth of which extends up to 800 Hz only, is comprised of samples Xs provided at a frequency of 2 KHz. Samples Xs are requantized in quantizer SBC by blocks of K samples. This requantizing step involves the techniques described in United States patent application Ser. No. 895,204 filed Apr. 10, 1978, now U.S. Pat. No. 4,142,071, which claims priority of French patent application Ser. No. 77 13995 filed on Apr. 29, 1977 and provides digital data designated by SIGNAL. The output of filter decimator LPFD also provides information representing the energy of the high bandwidth of the input signal to be generated, which information is requantized in quantizer QA1, thus generating a signal designated by ENERG. When the transcoder of this invention is used in a digital transmission system, data ENERG, SIGNAL and COEF are multiplexed by a conventional multiplexor MPX, onto a single transmission line.

In a preferred embodiment of the invention, an analog filter FT having a bandwidth between 300 and 3400 Hz is used. The converter A/D by techniques well known in the art provides 12-bit linearly quantized samples Sn generated at a sampling frequency of 8 KHz.

Figure 2:
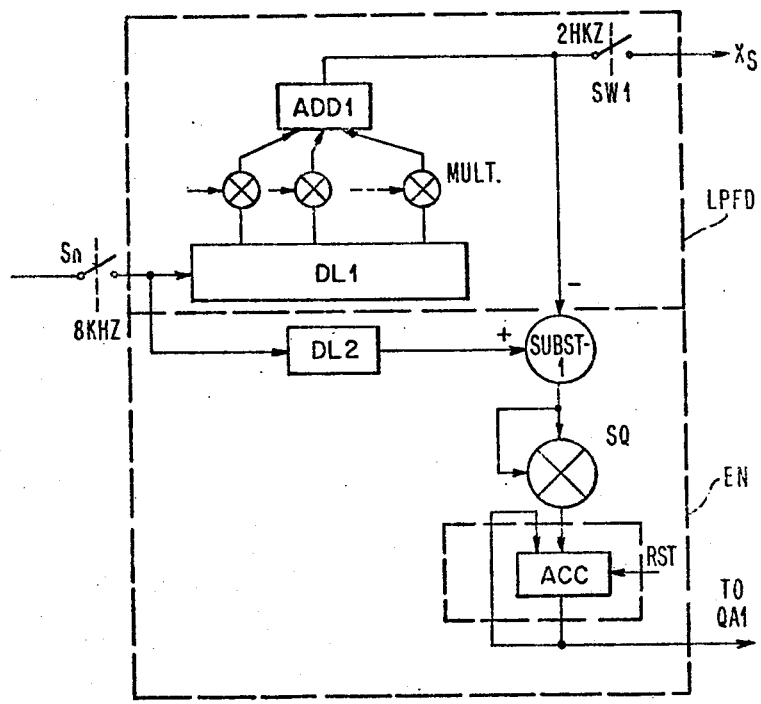
FIGS. 2 to 6' illustrate various embodiments of the elements of the coder of FIG. 1.

FIG. 2 shows an embodiment of devices LPFD and H. B. Energy. Samples Sn are applied to two delay lines. DL1 which is twice as long as DL2 is part of a digital filter which also includes multipliers MULT and an adder Add1. These elements provide a lowpass transversal filter with a cut-off frequency of 800 Hz and of unity gain in the pass band. The frequency of samples Xs from LPFD is restored to 2 KHz by periodically resampling the signal at the output of the lowpass filter at a lower frequency rate, e.g. equal to ¼ of the frequency of the samples fed into said low-pass filter one sample out of four at the output of the transversal filter. This so-called "decimation" operation is performed by using a switch SW1 periodically closed at a frequency of 2 KHz.

The information about the energy of the high frequency bandwidth of the voice signal ranging from 800 to 3400 Hz is obtained in a High-Band Energy measuring device designated by H. B. Energy by subtracting in SUBTR1, the samples from Add1 from those from DL2, then by squaring in SQ, the terms from SUBTR1 and thereafter by accumulating into ACC, the output of SQ for the duration of a sample block, i.e., a given period of time of 32 ms in this case. A signal RST is used to reset ACC to zero one or more times every 32 ms. The accumulator can also be replaced advantageously by a lowpass digital filter decimator, i.e., including a switch the switching frequency of which is adjusted in accordance with the frequency at which the corresponding energy information is to be used (1 to 4 times every 32 ms in this case). As required, the energy information can be requantized in circuit QA1 at a bit rate lower than the one of the terms from EN, in order to effect a reduction of the information bit rate.

Samples Xs from SW1 are requantized in an adaptive sub-band block requantizing means SBC. For this purpose, the bandwidth of samples Xs is split into sub-bands. Then each sub-band is subjected to a quantizing step which is dynamically adapted to the characteristics of the signal contained in said sub-band. The processes and devices used for this purpose are described in the above-identified U.S. patent application. In effect, it can be shown that bit rate $n_i$ to be assigned to the quantization of the $i^{th}$ sub-band to reduce the total quantizing noise on all the sub-bands is determined by the following equation:

$$n_i = \frac{N - \log_2 \prod_{j=1}^{p} E_j^{\frac{1}{2}}}{p} + \log_2 E_i^{\frac{1}{2}} = \sigma' + \log_2 E_i^{\frac{1}{2}} \quad (1)$$

where
N represents the total number of bits for all the sub-bands,
$E_i$ represents the sub-band energy contained in the $i^{th}$ sub-band when processing the corresponding block of samples,
p represents the number of sub-bands required for covering the whole spectrum of signal Xs.

Of course, since $n_i$ indicates a number of bits, only an approximate integer value of the result of operation (1) is used.

The quantizer adjustments are performed for the duration of a block, i.e., 32 ms in this case. (It is assumed that samples Sn have been taken from the coder input, in blocks of K=256 samples, at a frequency of 8 KHz). Therefore, during a time frame of 32 ms, it is possible to determine the amplitude limits within which the signal of each sub-band varies and since bit rate $n_i$ is known, to determine the value to which quantizing step Qi of the corresponding quantizer should be fixed. For instance, if it is assumed that the amplitude of the $i^{th}$ sub-band varies uniformly between two extreme values separated by ten volts and that the bit rate assigned to it is $n_i=1$, a step Qi=5 volts should be selected. This means that all the samples exceeding 0 volt will be coded "1", the ones under 0 volt "0", or conversely.

When the sub-band splitting in the frequency domain is sufficiently sharp, the frequency spectrum in each channel is relatively decorrelated. Then, it is obvious that the sub-band energy is proportional to the square of the amplitude of the largest sample (M) (in absolute value) contained in it. Then, $$E_i = \lambda \cdot M_i^2 \quad (2)$$

$\lambda$ being a proportionality coefficient.

By combining equations (1) and (2), one has:

$$n_i = \frac{1}{p} \left[ N - \log_2 \prod_{j=1}^{p} M_j \right] + \log_2 M_i \quad (3)$$

$$= \sigma + \log_2 M_i$$

From the above-given equations and by giving an approximate integer value of the computed results of $n_i$, it is unlikely that one would obtain the following:

$$\sum_{i=1}^{p} n_i = N \quad (4)$$

But when the various values of $n_i$ for all the sub-bands are obtained, they are readjusted to satisfy equation (4). This readjustment is carried out by a redistribution of bits, by adding or subtracting units to or from certain $n_i$.

The preliminary analog/digital conversion in A/D has been carried out in a conventional way with a high bit rate N' to ensure a sufficient accuracy, then the device of this invention is used to requantize the signal samples to reduce, as required, the total bit rate used on all the sub-bands or alternatively to distribute the N available bits in a more rational way. Therefore, one defines: $N < N'$. (In certain cases, it would be possible to choose $N = N'$, then there would not be any real compression, but a better bit allocation).

Figure 3:
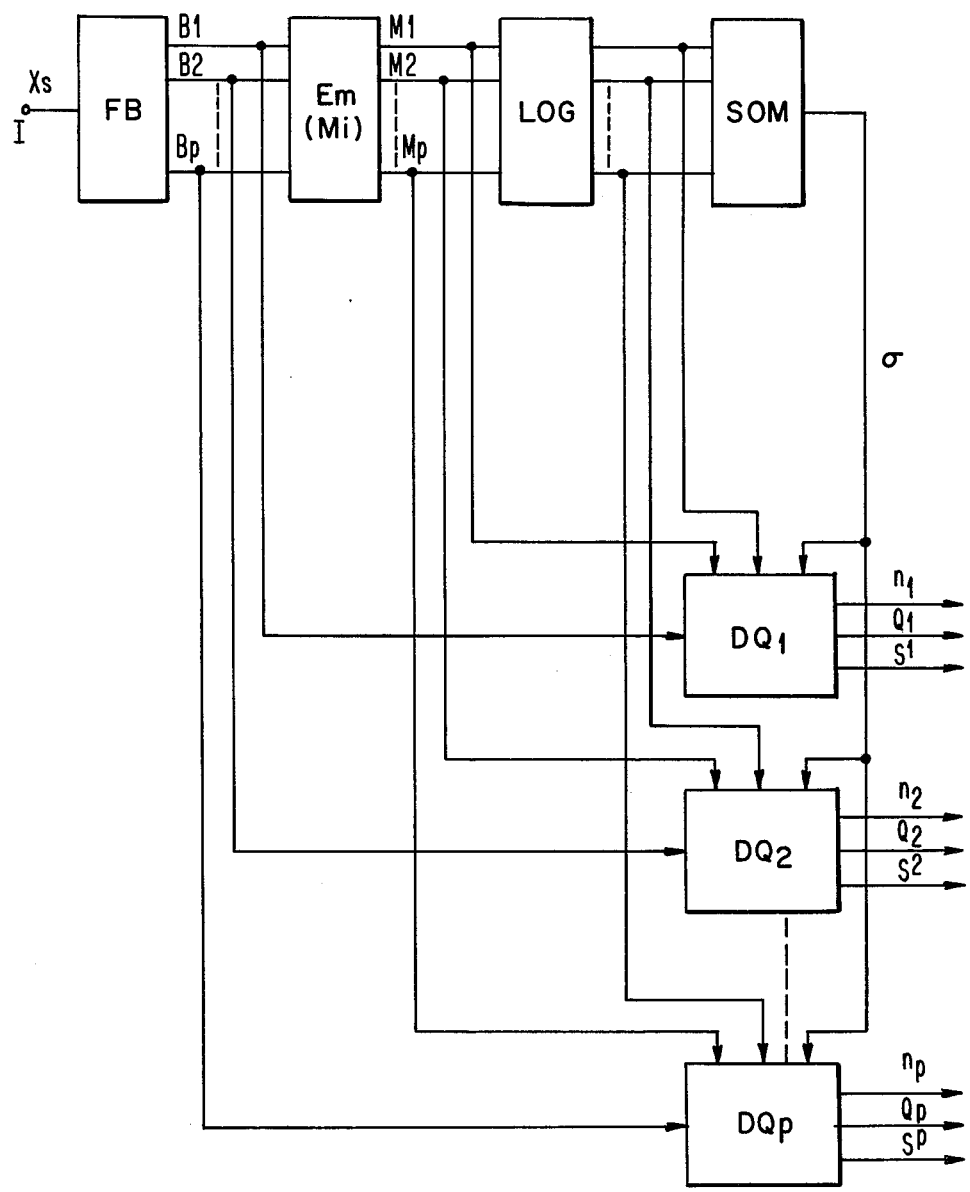
Figure 4:
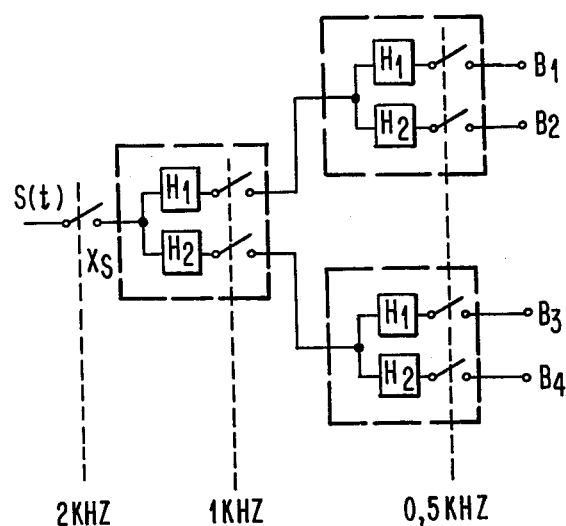
Figure 5:
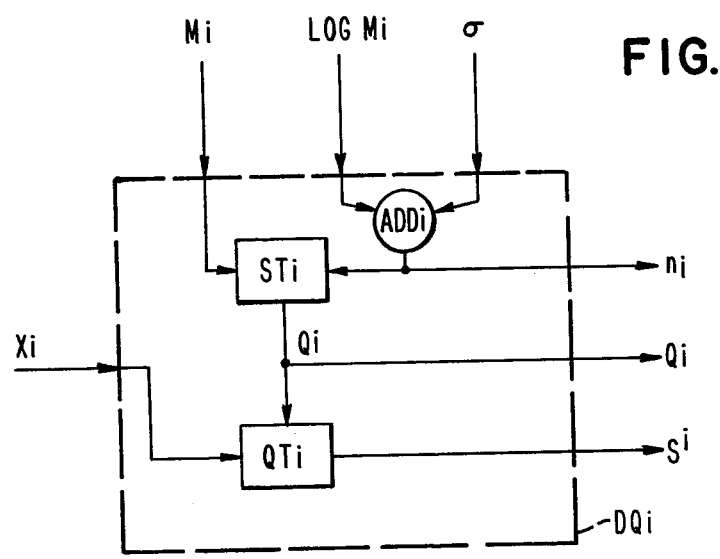

The device shown in FIG. 3 enables the above-described quantizing process to be carried out. In said device, samples Xs are transmitted to a bank of filters FB which splits the signal into p sub-bands containing samples $X^i$ (with $i = 1, 2, \ldots, p$). Filter FB is constructed as shown in FIG. 4. In said filter, samples Xs are filtered through a system provided with a tree structure comprised of similar cells. Each cell includes two half-band quadrature filters (H1 and H2) and switches which select one out of two samples from each output of said filters. This is a decimation (periodic resampling) operation associated to the filtering operation performed through H1 or H2. For more details about this filtering operation, refer to IBM Technical Disclosure Bulletin, Vol. 19, No. 9, February 1977, pages 3438 and 3439. When p=4, the periodic resampling operation provides four sub-bands B1 through B4, and when the rate of Xs is $f_e = 2$ KHz, the samples are provided at a rate of 0.5 KHz over each of these sub-bands. In each sub-band, an energy measuring device Em sorts the samples it receives during a given period of time, to determine the largest one (M) in magnitude. In other words, (Em) determines values Mj for $j = 1, 2, \ldots, p$. Then these values are applied to a logarithm generator LOG which can be a table in which the coordinates of the points of function $y = 2^x$ are recorded or to a microprocessor, the program of which performs the computation of the base 2 logarithm of $M_j$ from a conventional limited development expression. Then values log $M_j$ are applied to an adder SOM which adds said values log $M_j$, multiplied by 1/p, and subtracts the result of this operation from the predetermined value N/p. Therefore, the device SOM generates the term $\sigma$. At this point all of the information for quantizing the sub-bands are available. For a better understanding of the description, it is assumed here that each sub-band is quantized separately. Let us assume that $DQ_i$ is the device quantizing the $i^{th}$ sub-band. As shown in FIG. 5, $DQ_i$ includes: an adder ADDi, a quantizing step generator STi and a quantizer QTi. The addition of the values of log $M_i$ and of $\sigma$ in ADDi provides $n_i$ which is used in STi to generate the quantizing step Qi.

$$Q_i = \frac{M_i}{2^{n_i-1}} \quad (5)$$

The information $Q_i$ being provided to the quantizer QTi, said quantizer QTi requantizes the samples $X^i$ at bit $X^i \geq 0$, QTi will provide $S^i = 1$ and when $X^i < 0$, it will provide $S^i = 0$.

Thus, samples $X^i$ initially coded in PCM mode at N' bits (12 bits for instance) are recoded at $n_i = 1$ bit.

By using the above described quantizer SBC, it is not only possible to save quantizing bits by selecting $N < N'$ as desired, but also to ensure a more rational distribution of these quantizing bits.

As seen above, the operation of quantizer SBC requires the analysis of the sub-band contents over a predetermined period of time. Thus, it seems not desirable to change the bit rate $n_i$ and the quantizing step for each sample. On the other hand, this process is particularly adapted for the coding of samples by blocks as it is done in the Block Companded PCM type of coding process which can be briefly described as follows: for each block of samples, a scale factor C is chosen so that the largest sample of the block does not fall beyond the coding limits. Then the block samples are quantized. The assembly comprised of the scale factor (or block characteristic) and the quantized block of samples provides the digital information which fully defines the block. For more details about this type of coding one can refer to the article of A. Croisier concerning a lecture given at the Zurich International Seminar on Digital Communication of 1974. In this invention, $n_i$ will be thus defined for the duration of each block.

The value of $M_i$ or a value close to it can be chosen as the scale factor $C_i$ in which case equation (3) becomes:

$$n_i = \frac{N - \log_2 \prod_{j=1}^{p} C_j}{p} + \log_2 C_i \quad (6)$$

Of course, when the signal is to be decoded so as to reconstitute the original information S(t), not only sequences $S^i$ of each channel will be needed but also scale factors $C_i$. If this type of coder-decoder is used in the communication domain, it is possible to reduce the chances for overloading the channels by not transmitting the bit rate information $n_i$, since they can be recalculated at the receiver level from equation (6). Therefore, for the p sub-bands and for each time frame of 32 ms, p values of $Q_i$, p values of $C_i$ and the K values of the signal samples requantized by the devices of the p channels of the invention are transmitted.

In addition, while taking the characteristics of the signal to be quantized into account, it is possible to improve the coder performance by permanently forcing certain terms $n_i$ to zero, in particular the ones concerning the limiting sub-bands under 300 Hz and above 800 Hz (minimum and maximum values of i).

As shown in FIG. 1, samples $S_n$ are also applied to a conventional high pass filter which eliminates the components of the signal under 800 Hz. Its output feeds device CALC which determines the coefficients characterizing the voice signal being processed. For a good understanding of the origin and function of these coefficients, one may refer to the article of L. S. Moye entitled, "Digital Transmission of Speech at Low Bit Rates" published in Vol. 47, No. 4 of the "Electric Communications Review" of 1972, page 217, and the following. The redundancy of the voice signal is shown in this article from which it appears that each sample of the voice signal can be estimated from a linear combination of previous samples by the following equation:

$$\hat{S}_n = \sum_{i=1}^{g} a_i \cdot S_{n-1}$$

g being a predetermined integer. Various methods for determining the $a_i$ coefficients are known in the art, and in particular, the autocorrelation method of F. Itakura and S. Saito presented at a lecture given to the Japan Acoustical Association in 1969 and entitled, "Speech Analysis—Synthesis System Based on Partial Autocorrelation Coefficient." This method tends to minimize the mean square error ER based on the following equation:

$$ER = \sum_{n=1}^{K} (Sn - \hat{S}n)^2 = \sum_{n=1}^{K} (Sn - \sum_{i=1}^{g} a_i S_{n-i})^2$$

by performing a total estimation in which it is assumed that the signal is null outside the frame of the block to be processed. It is known in the art that ER is minimized when the following equation is satisfied:

$$R_j = \sum_{i=1}^{g} a_i \cdot R_{|j-i|} \text{ with } j = 1, 2, ..., g \quad (7)$$

with $$R_j = \sum_{n=0}^{K-1} S_n \cdot S_{n+|j|} \text{ with } j = 0, 1, ..., g \quad (8)$$

By varying j and i, a series of linear equations is obtained in which the terms R represent the samples of the autocorrelation function of the voice signal. However, it is necessary to take into account that one has assumed for computing the correlation coefficients that the signal is null outside the analysis block. If this hypothesis is taken into account, one has:

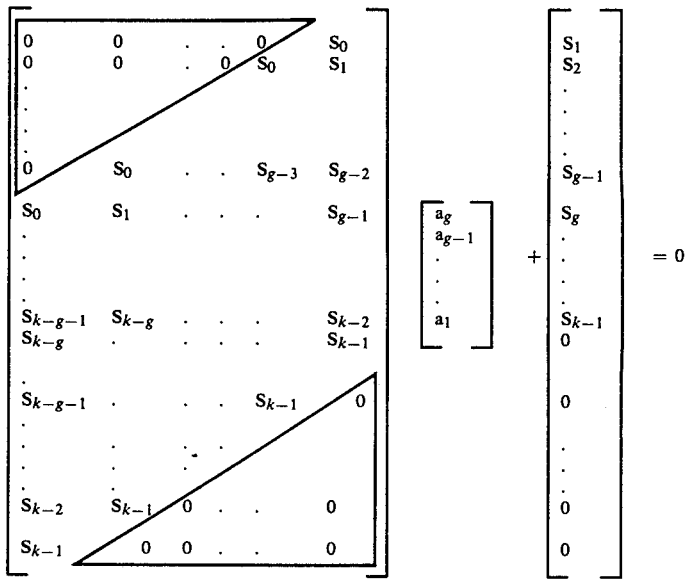

This method is described in an article entitled, "Experimental Comparison Between Stationary and Non-Stationary Formulation of Linear Prediction Applied to Voiced Speech Analysis," published by Satish Chandra and Wen C. Lin in the IEEE Transactions on Acoustics, Speech and Signal Processing Review, Vol. ASSP22, No. 6 December 1974.

Starting from terms $R_j$, the parameters $a_i$ can be obtained in a recursive way by using an algorithm proposed by Levinson in the Journal of Mathematics and Physics, Vol. 25, No. 4, page 261, 1947. In fact, the algorithms of Levinson use so-called partial correlation coefficients k. Our device CALC computes these k coefficients. For this purpose, we use the methods and algorithms proposed by J. LeRoux and C. Gueguen in an article published in the IEEE Transactions on Acoustics, Speech and Signal Processing of June 1977.

In addition, it is possible to compensate for the combined effects of the glottal source and buccal cavity which induce a decrease of the voice signal spectrum at 6 db per octave, which is particularly perceptible in the case of voiced sounds by pre-emphasizing the signal before using it for calculating the autocorrelation coefficients. This pre-emphasis is accomplished by using a preemphasis filter having a z transfer function of the following type:

$$H(z) = 1 - \alpha z^{-1}$$

where $\alpha = R1/R0$, R0 and R1 being the first two points of autocorrelation function of Sn. In this case, it is necessary to calculate the first terms of the autocorrelation function of the signal, to determine $\alpha = (R1/R0)$, then to filter the samples Sn by using a pre-emphasis filter $H(z) = 1 - \alpha z^{-1}$, and to recalculate the terms of the autocorrelation function. Filtering through H(z) will be avoided and thus, a portion of the total computing power required by the pre-emphasis and autocorrelation operations will be saved by using in CALC a digital filter of the type shown in FIG. 6. This filter is connected at the output of the device computing the terms R0, R1, and it derives the values of R'0 and R'1, ... of the autocorrelation function, as if the signal applied to CALC was pre-emphasized. The remaining part of the LeRoux's method for determining coefficients $k_i$ remains unchanged. In other words, the samples Sn from filter HPF are applied to an autocorrelation function generator COMP (Ri) performing the operations of equation (8). The device COMP (Ri) includes a memory containing two consecutive blocks of data, and multiplying circuits, and computes the following:

$$R0 = \sum_{n=0}^{K-1} S_n^2 = S_0^2 + S_1^2 + \ldots + S_{K-1}^2$$

$$R1 = \sum_{n=0}^{K-2} S_n \cdot S_{n+1} = S_0 S_1 + S_1 S_2 + \ldots S_{K-2} S_{K-1}$$

$$R_g = \sum_{n=0}^{K-g-1} S_n \cdot S_{n+|g|}$$

$$R_{g+1} = \sum_{n=0}^{K-(g+2)} S_n \cdot S_{n+|g+1|}.$$

By dividing R1 by R0, COMP(Ri) determines $\alpha$. This coefficient is used in a circuit COMP (R'$_i$) or preemphasis filter computing coefficients R'$_1$ through the following equation:

$$R'_i = R_i + \alpha(-R_{|i-1|} + \alpha R_i - R_{|i+1|}).$$

Then, the terms R'$_i$ are applied to a partial autocorrelation circuit COMP (k$_i$) generating the terms K$_i$ defined by LeRoux and Guegen, which terms are defined here with respect to pre-emphasized autocorrelation coefficients R'$_1$ and not with respect to terms R$_1$. The device COMP (k$_i$) can be realized by using a computer programmed for carrying out a recursive computation, the algorithm of which is represented on FIG. 6' (for g=3). The terms R' are loaded into adders (e$^0$) forming a first stage. The value of k$_o$ is computed by using the contents of this first stage. The outputs of the adders of said first stage eventually multiplied by k$_o$ (as shown on the figure), feed a second stage of adders (e$^1$) (see the figure) from the contents of which k$_1$ is computed. The outputs of the stages of group (e$^1$) eventually multiplied by k$_1$, feed a third stage (e$^2$), the contents of which allows k$_2$ to be computed.

The coefficients k$_i$ will eventually be requantized in QA2 which can, as QA1, be of a conventional type but be provided with a quantizing step and characteristics which are redefined to be more closely adapted to the type of information to be processed, and to reduce the information rate. For instance, as far as QA2 is concerned, starting from statistical data, one has requantized terms k$_i$ with a number of bits fixed in accordance with the order i. The quantizer QA2 transmits a set of coefficients for each block of samples of the processed voice signal on channel COEF, for instance every 32 ms. Therefore, these coefficients are preemphasized parcor type coefficients.

The above indicated processing for determining ENERG, SIGNAL and COEF introduces delays. In effect, in the embodiment chosen as an example, terms S$_n$ are taken by blocks of 256 samples. Therefore, for a sampling frequency of 8 KHz (Te=125 $\mu$s), the block has a duration of 32 ms. The delays due to each of filters HPF and LPFD are 28×125 $\mu$s. The one due to device CALC performing correlations is 32 ms. In order to have the terms COEF and SIGNAL in phase, it is therefore necessary that SBC introduce a delay of 32 ms. But the delay due to the SBC filter is 144×125 $\mu$s. Therefore, it is necessary to add a 112×125 $\mu$s delay line on the channel leading to the output SIGNAL. For the same reasons, a 256×125 $\mu$s delay line is needed in the path ENERG. (These delay lines are not shown on FIG. 1)

The above described schematics can be modified without departing from the scope of this invention. For instance, filter HPF may be eliminated in a simplified embodiment.

Figure 7:
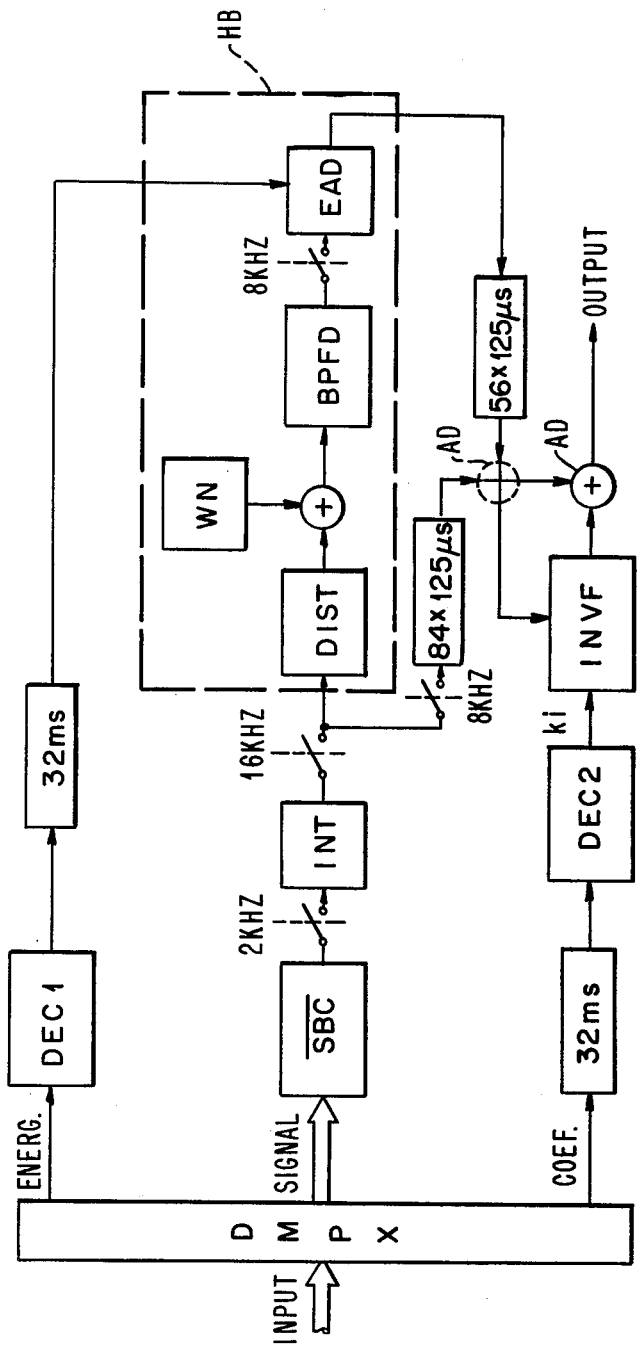
FIG. 7 is a block diagram of a decoder constructed according to the invention.
Figure 7:
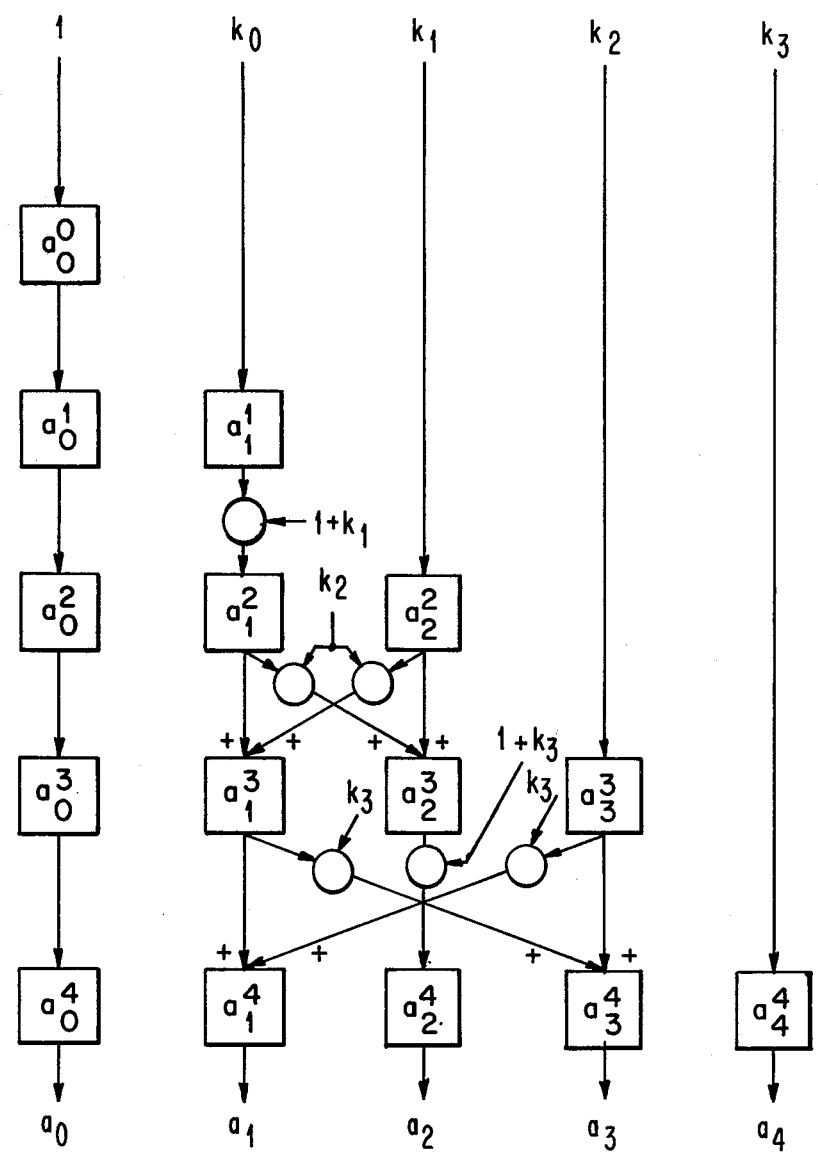

When the original voice signal, i.e., signal S$_n$, is to be reconstructed, it is necessary to recombine the ENERG, SIGNAL and COEF data. These operations are carried out in a receiver-decoder which is constructed as shown in FIG. 7. The data applied to the input line are, first of all, demultiplexed in DMPX which separates the data of channels ENERG, SIGNAL and COEF from each other.

Figure 8:
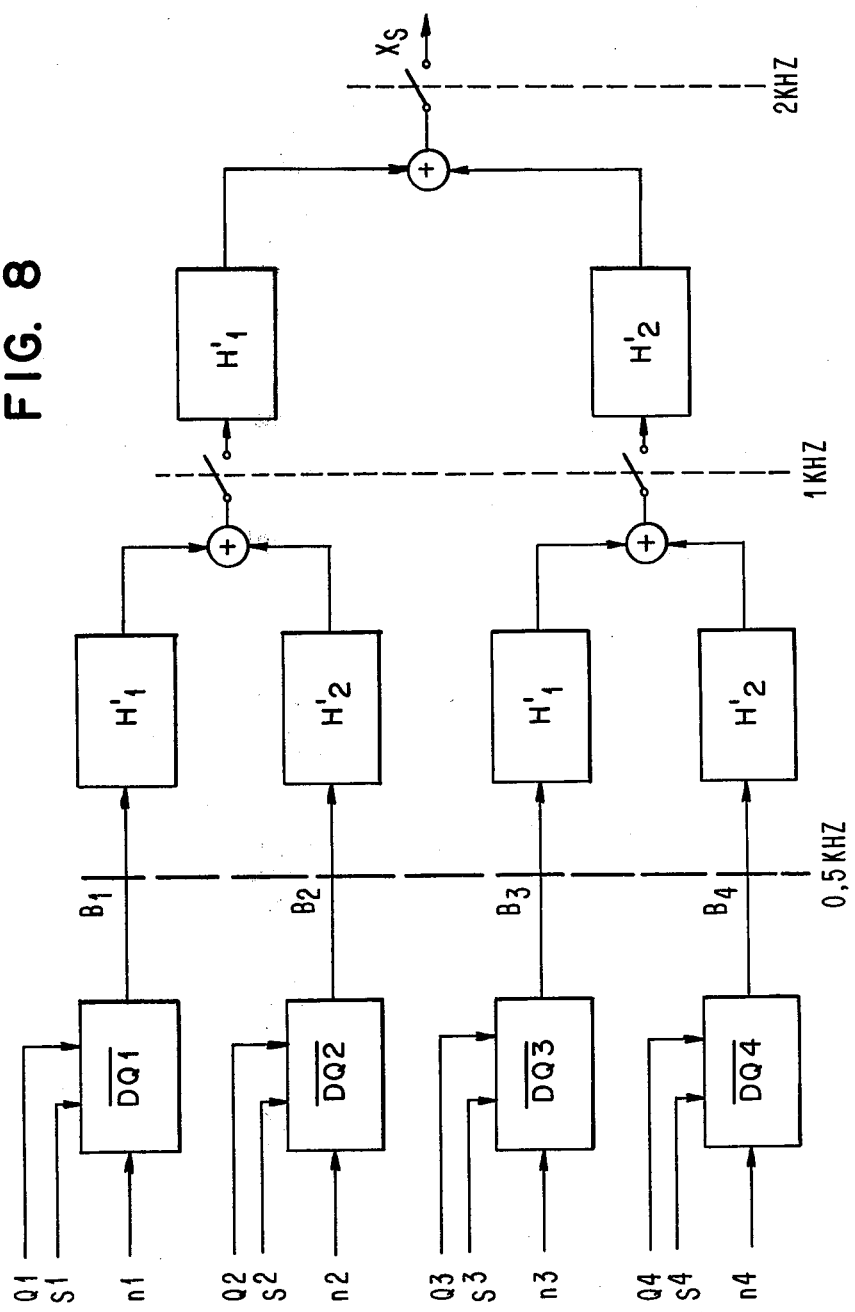
FIGS. 8 and 9 illustrate various embodiments of some of the elements of the decoder shown in FIG. 7.

The information SIGNAL is decoded in $\overline{SBC}$ which has to provide samples Xs. The device $\overline{SBC}$ shown in FIG. 8 includes four devices $\overline{DQ1}$ to $\overline{DQ4}$ (in this case p=4) feeding a set of filters carrying out the inverse of the operation performed by the set of filters used at the transmitter end and represented by FB in FIG. 3.

The device $\overline{DQi}$ processing the i$^{th}$ order sub-band receives requantized samples S$^i$ and information n$_i$ and Q$_i$. It derives therefrom the information concerning bandwidth B$_i$ as it appeared at the output of filter FB at the transmitter end (see FIG. 3). For this purpose, if it is assumed that n$_i$=1, for instance, device $\overline{DQi}$ provides the digital value corresponding to Q$_i$ at its output when S$^i$=1 and $-Q_i$ when S$^i$=0. The outputs of circuits $\overline{DQ1}$ to $\overline{DQ4}$ are recombined into a filtering and interpolation assembly so as to reconstruct the original signal Xs, at 2 KHz. The filtering operation is performed by using elements H'1 and H'2 which consist of quadrature high-pass and low-pass half-band filters, respectively. The interpolation is ensured by interpolating a zero between two consecutive input samples, then by adding the outputs of each pair of filters taken so as to generate samples Xs at 2 KHz.

The Xs frequency is brought back to 16 KHz by an interpolator INT. This device computes the intermediate samples to be placed between two consecutive samples at 2 KHz, the interpolation can be achieved through a filter. The output path of signal Xs from the interpolator is split into a direct path and an indirect path. The indirect path includes a high band generator HB in which the low-band spectrum is spread by non-linear distortion (in DIST), from there the high band is extracted by filtering through BPFD and said high band is modulated in EAD by the energy information provided by channel ENERG. In addition, since certain sounds such as the fricative sounds, for instance, provide a very low energy level in their low bandwidth, the energy of the signal provided by DIST can be insufficient to meet the requirements of the decoder of this invention. Therefore, we added energy, provided by a white noise generator WN, to the output of DIST. The level of this energy is to be adjusted so that it can ensure its functions for the sounds with low energy in the low frequency bandwidth without disturbing the system operation when processing voiced sounds. For this purpose, it is necessary that the white noise have a low amplitude with respect to high band energy of the voiced sounds. The WN adjustment can be either empirically or dynamically provided as will be seen later. The signal resulting from the addition of white noise to the information provided by DIST goes through band-pass filter decimator (BPFD) the low frequency cutoff of which is set to 800 Hz. The decimation operation performed through BPFD brings the sample frequency back to 8 KHz. These samples are fed into the EAD which provides information on the high frequency band of the voice signal received by normalizing the high band level. This normalization is ensured by measuring the energy E2 from bandpass filter decimator BPFD by comparing E2 with energy E1 from decoder DEC 1 placed on channel ENERG and finally modulating the signal from BPFD by the result of this comparison. DEC 1 performs the inverse of the operation performed in QA1, i.e., it provides the energy information expressed with the same units as the ones used in EN to obtain the actual high frequency band of the voice signal received by the decoder-receiver. The output of EAD is filtered through a transversal digital filter INVF, the coefficients of which are provided by channel COEF, which have been decoded in DEC 2. Device DEC 2 performs a dual operation: the first one is the inverse of the operation performed by QA2 to generate terms $k_i$, the second one provides terms $a_i$ from terms $k_i$. In practice, it is possible to avoid the conversion of terms $k_i$ into terms $a_i$ and to use directly terms $k_i$ as the coefficients of filter INVF provided that the latter is a lattice network designed in accordance with the teachings of J. D. Markel et al in their book entitled, "Linear Prediction of Speech," paragraph 5.4.

Figure 6:
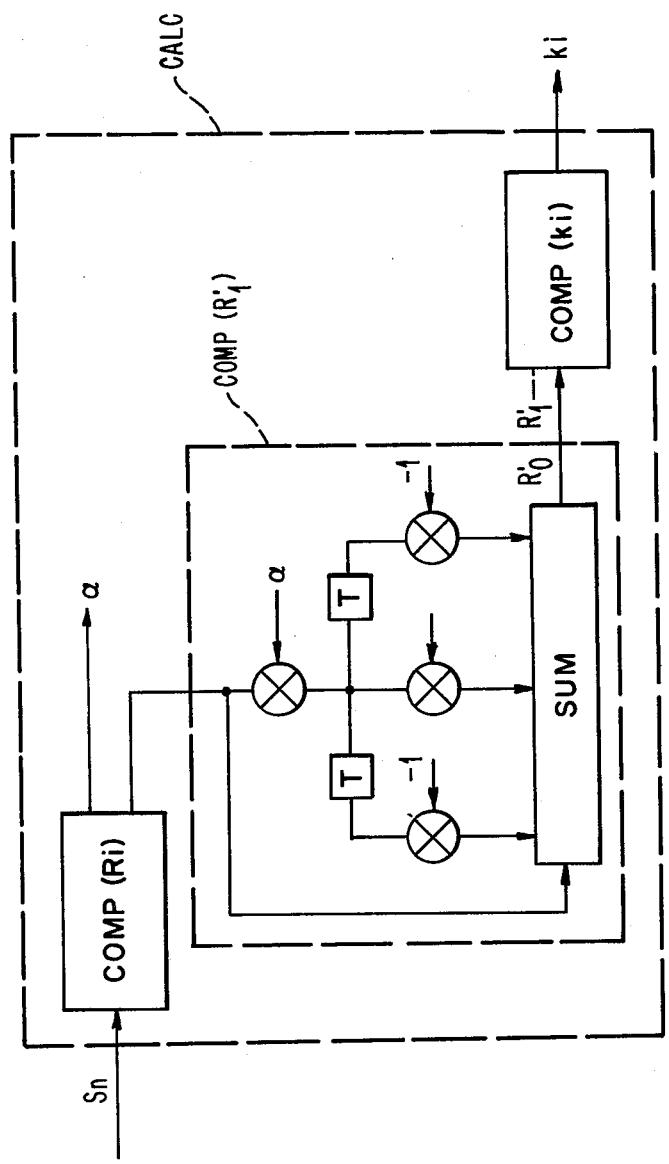
Figure 6:
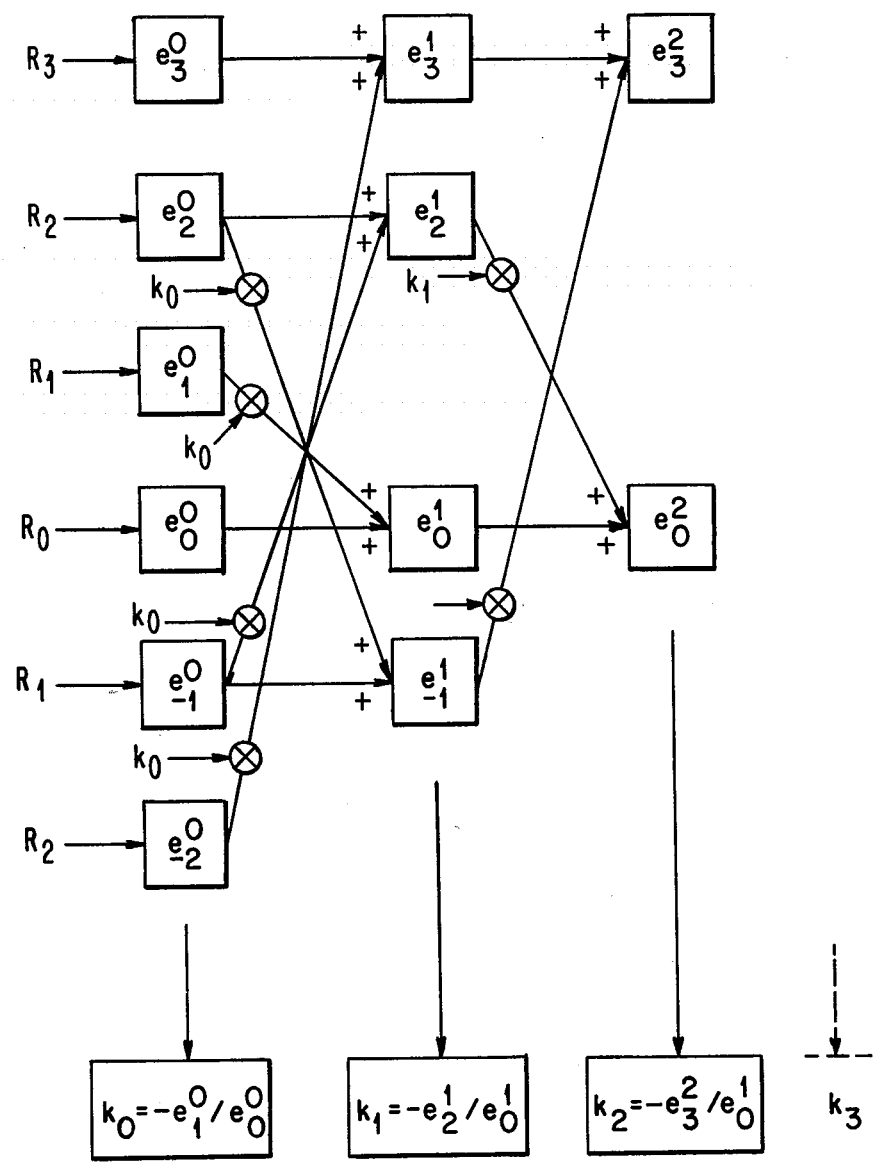

When terms $a_i$ are to be used, they may be recalculated by using the algorithm of FIG. 7' (the representation of which uses a symbolism similar to the one used in FIG. 6').

Figure 9:
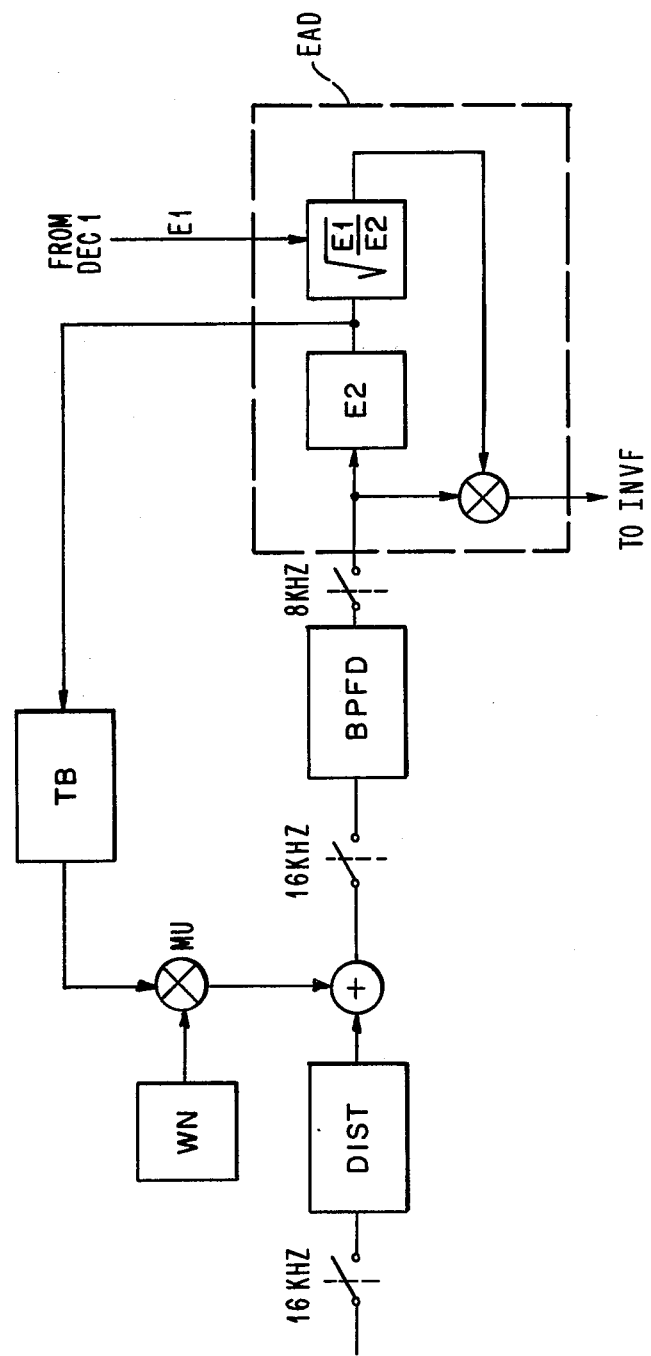

The reason for using a white noise source WN was mentioned above. It was also mentioned that it is possible to adjust empirically and in a fixed manner, the amplitude of the signals provided by said source. For this, one starts from a statistical and empirical evaluation of the energy level E2. But after having measured energy E2, it is also possible to use the result of this measurement to improve the adjustment of WN. For this purpose, we have in FIG. 9 another possible embodiment of HB, multiplier MU multiplying output WN by a coefficient (for instance, ranging from 1 to 10), provided by a table TB, the reading of which can depend either on E2, or on the relation between E1 and E2.

Finally, the original voice signal is reconstructed by adding the samples Xs from INT and brought back to 8 KHz in AD.

As indicated for the transmitter, the treatments applied to the various channels ENERG, SIGNAL and COEF introduce delays into the signals from INVF. Before recombining the information for regenerating the voice signal, it is necessary to compensate for these delays. This explains the presence of the 32 ms, 84×125 μs, 56×125 μs delay elements shown in FIG. 7. It is assumed for this that decoder $\overline{SBC}$, interpolator INT and filter BPFD respectively, introduce delays of 144×125 μs, 28×125 μs and 28×125 μs.

In addition, it is possible to improve the performance of the receiver shown in FIG. 7 by modifying the $a_i$ or $k_i$ coefficients more than once per 32 ms. One should then determine, between two actually received sets of coefficients $a_i$, intermediate coefficients calculated by linear interpolation while taking into account the sets of coefficients $a_i$ concerning the data blocks immediately preceding and following the block under process.

On the other hand, if the filter HPF is not used at the transmission end, it is necessary to place at the receiver end the adder AD at the input of filter INVF instead of putting it at the output of INV in which it receives its input from the two delay lines and provides its output to INVF and the output is taken directly from INVF.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. Process for compressing a digitally encoded voice signal, said compression resulting from a transcoding operation, characterized in that it includes the following steps: on a recuring basis splitting an epoch of the frequency bandwidth of said voice signal into a low frequency and a high frequency band, digitally coding and requantizing with dynamic bit allocation for each epoch the contents of said low frequency band for each epoch to generate SIGNAL information, processing the contents of said high frequency band for each epoch to generate a set of preemphasised parcor type coefficients (COEF), processing the contents of said high frequency band for each epoch to generate energy information (ENERG), said SIGNAL, COEF and ENERG data generated for each epoch providing the digital data characterizing the compressed voice signal.

2. Process for digitally compressing a voice signal according to claim 1, also characterized in that the juxtaposition of said low and high frequency bands covers the whole bandwidth of the voice signal to be compressed.

3. Process for transcoding a sampled and digitalized voice signal, characterized in that it includes the following steps: splitting the voice signal into blocks of samples; splitting the frequency band of said voice signal into a low frequency band and a high frequency band, coding the information of said low frequency band by splitting the band thereof into several sub-bands and by requantizing each of said sub-bands with a bit rate determined for each block of samples in accordance with the energy contained in said sub-band, said coding of the whole low frequency band supplying SIGNAL information, processing the contents of said high frequency band to generate a set of preemphasized parcor type coefficients (COEF) for each block of samples being processed, determining an energy information (ENERG) about the high frequency portion of the bandwidth of the signal to be compressed considered by blocks, and multiplexing the said SIGNAL, COEF and ENERG data on a transmission line.

4. A device for digitally compressing a voice signal, characterized in that it includes: an input, first means for applying to said input the samples of a telephone band of the voice signal taken by blocks of constant length, second means connected to said input for receiving and splitting the applied signal bandwidth into a high frequency band and a low frequency band, third means responsive to the information of said high frequency band and generating the preemphasized parcor type coefficients (COEF) of the signal it contains, periodic resampling means receiving the information of said low band, submitting it to a periodic resampling operation and quantizing it by splitting it into sub-bands and dynamically adapting the bit rate assigned to the quantization of each sub-band in accordance with the energy contained in said sub-band, so as to generate a SIGNAL information, means for determining the energy of the high frequency band connected to said input and to said periodic resampling means and generating information ENERG, means receiving said information COEF, SIGNAL and ENERG for multiplexing them on a transmission line.

5. A device for the digitally compressing a voice signal in accordance with claim 4 characterized in that the determination of said preemphasized parcor type coefficients is carried out by using means including: an input terminal, first means for applying the samples of the signal to be processed to said input terminal, means generating autocorrelation functions to determine a set of correlation coefficients for each of said blocks of samples, said means being connected to said input terminal, means for generating the ratio between the first two terms of said set of coefficients, a pre-emphasis filter based on said ratio, the input of which is connected to the output of said means for generating autocorrelation functions, partial autocorrelation means the input of which is connected to the output of said pre-emphasis filter, and the output of which delivers said partial correlation coefficients.

6. Process for decoding a compressed coded voice signal of the character described in claims 11 or 12 characterized in that it includes the following steps: separating through a demultiplexing operation, the data of channels ENERG, SIGNAL and COEF from each other and decoding said information; performing a linear interpolation of the decoded information of the SIGNAL channel; splitting said information into two paths, one direct and one indirect; processing said indirect path by performing distortion, high pass filtering and normalization of the energy level contained in said indirect path by the ENERG information; performing an operation of filtering the information delivered by the output of said indirect path through an inverse filter the coefficients of which are obtained from information COEF; adding the contents of said direct path to the result of said filtering operation.

7. Decoding process according to claim 6 characterized in that a white noise energy is added to the signal appearing on said indirect path after said distortion.

8. Decoding process according to claim 7 also characterized in that the level of said white noise energy is dynamically adjusted in accordance with the energy level measured on said indirect path.

9. A device for decoding a compressed coded voice signal of the character described in claim 6 including: input means; demultiplexing means connected to said input means for separating the ENERG, SIGNAL and COEF data into a first, second and third channel respectively; first, second and third decoding means, the inputs of which are connected to said first, second and third channels, respectively; interpolation means the input of which is connected to the output of the decoding means of said second channel and the output of which feeds two paths: one direct and one indirect; means connected to said indirect path and including: non-linear distortion means responsive to the interpolation means output; white noise generating means for providing a white noise-like signal; first adding means the inputs of which are connected to the outputs of said non-linear distortion means and said white noise generating means; filtering and decimation means the input of which is connected to the output of said first adding means; modulation means the inputs of which are connected to the output of said filtering and decimation means and to the output of said first decoding means; inverse filtering means the input of which is connected to the output of said third decoding means and the coefficients of which are provided by the output of said modulation means; and, second adding means for reconstructing the voice signal by adding the output of said inverse filtering means to the output of said interpolating means on said direct path.

10. A device for decoding a compressed coded voice signal according to claim 9 also characterized in that said modulation means include: measuring means for measuring energy E2 provided by said inverse filtering means, comparing means for comparing E2 to the energy E1 provided by said first decoding means, and modulation means for modulating the energy provided by said white noise generating means by a coefficient selected from the information provided by said comparing means.

11. A data compression process for compressing a voice signal extending over the telephone bandwidth, which has been sampled at a first given rate and quantized with a relatively high number of bits, said process including the following steps:
splitting the frequency bandwidth of said sampled and quantized voice signal into a low frequency bandwidth and a high frequency bandwidth;
periodically resampling said low frequency bandwidth at a rate lower than said first given rate;
splitting the resampled low frequency bandwidth into p sub-bands;
subjecting each of said p sub-bands to an adaptive sub-band block requantizing operation using a quantizing step dynamically adapted to the sub-band energy contained in said each sub-band;
collecting the requantized information over the p sub-bands into a SIGNAL data information;
measuring and quantizing the energy contained in said high frequency bandwidth for deriving ENERG data;
processing the information contained in said telephone bandwidth for deriving COEF data representing preemphasized parcor type coefficients; and,
multiplexing said SIGNAL, COEF and ENERG data.

12. A data compression process for compressing a voice signal extending over the telephone bandwidth, sampled at a first given rate and quantized with a relatively high number of bits, said process including the following steps:
splitting the frequency bandwith of said sampled and quantized voice signal into a low frequency bandwidth and a high frequency bandwidth;
periodically resampling said low frequency bandwith at a rate lower than said first given rate;
splitting the resampled low frequency bandwidth into p sub-bands;
subjecting each of said p sub-bands to an adaptive sub-band block requantizing operation using a quantizing step dynamically adapted to the sub-band energy contained in said each sub-band;
collecting the requantized information over the p sub-bands into a SIGNAL data information;
measuring and quantizing the energy contained in said high frequency bandwidth for deriving ENERG data;
processing the information contained in said high frequency bandwidth for deriving COEF data representing preemphasized parcor type coefficients; and, multiplexing said SIGNAL, COEF and ENERG data.

13. A data compression process according to claims 11 or 12 wherein said adaptive sub-band block requantizing operation uses the Block Companded PCM techniques performed over blocks of signal samples provided on the p sub-bands over a given period of time.

14. A data compression process according to claim 13, wherein the SIGNAL data includes p values of quantizing steps, p values of scale factors and the requantized signal samples on the p sub-bands over said given period of time.

15. A device for digitally compressing a voice signal extending over the telephone frequency bandwidth, said signal being sampled at a first given rate and quantized with a relatively high number of bits, said device including:
- filtering means for receiving said sampled and quantized voice signal and providing the high frequency components of said voice signal at an output thereof and the low frequency components of said voice signal at another output thereof;
- means for determining preemphasized parcor type coefficients receiving said low frequency components of said voice signal and providing preemphasized parcor type coefficients;
- first requantizing means for receiving said preemphasized parcor type coefficients and providing COEF data;
- periodic resampling means for receiving said high frequency components of said voice signal and for periodically resampling said high frequency components of said voice signal;
- adaptive sub-band block requantizing means for receiving the periodically resampled high frequency components of said voice signal and providing SIGNAL data;
- high band energy measuring means for receiving said high frequency components of said voice signal and providing information relative to the energy of said high frequency components of said voice signal;
- second requantizing means for receiving said information relative to the energy of said high frequency components of said voice signal and providing ENERG data; and
- multiplexing means for multiplexing said COEF, SIGNAL and ENERG data over a single output channel.

16. A device for digitally compressing a voice signal in accordance with claim 15 characterized in that the determination of said preemphasized parcor type coefficients is carried out by using means including:
- an input terminal;
- first means for applying the samples of the signal to be processed to said input terminal;
- autocorrelation function generator means with input connected to said input terminal;
- preemphasis filter means with input connected to the output of said autocorrelation function generator means; and,
- partial autocorrelation circuit means with input connected to the output of said preemphasis filter means.

* * * * *